United States Patent

[11] 3,550,590

| [72] | Inventor | James J. Keilman<br>2740 W. Granville Ave., Chicago, Ill. 60626 |
|---|---|---|
| [21] | Appl. No. | 750,572 |
| [22] | Filed | Aug. 6, 1968 |
| [45] | Patented | Dec. 29, 1970 |

[54] SURGICAL BANDAGE
5 Claims, 5 Drawing Figs.

| [52] | U.S. Cl. | 128/161, 128/157, 128/159 |
|---|---|---|
| [51] | Int. Cl. | A61f 5/40 |
| [50] | Field of Search | 128/161, 132, 134, 138, 155, 157, 158, 159, 162, 168, 283 |

[56] References Cited
UNITED STATES PATENTS
2,407,735  9/1946  Beckerman .................. 128/157

*Primary Examiner*—Adele M. Eager
*Attorney*—Harbaugh and Thomas

ABSTRACT: A bandage and bandage holder for use to protect the male genitals and provide comfort and protection for these parts after injury or surgery, such as circumcision. In one embodiment the invention provides a belt holder for a bandage, said bandage having an adjustable tubular portion to encompass the male genitals. The device is characterized by the comfort it provides the wearer, convenience of use, lack of interference with ordinary body functions, ease of interchange of bandages and the weight support assist borne directly by the belt.

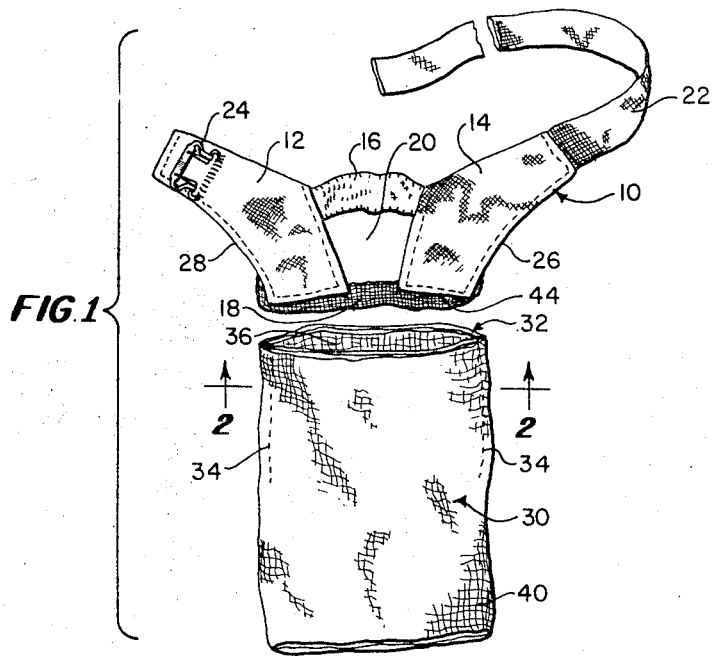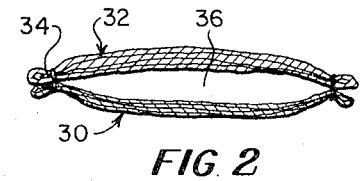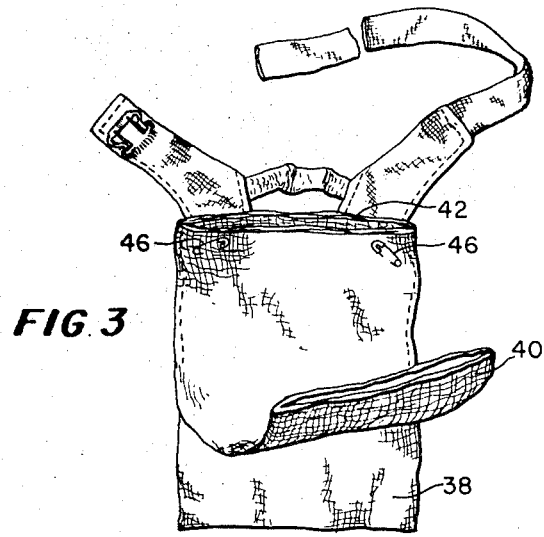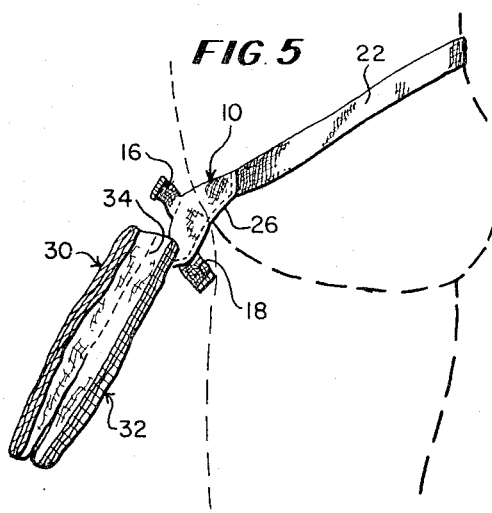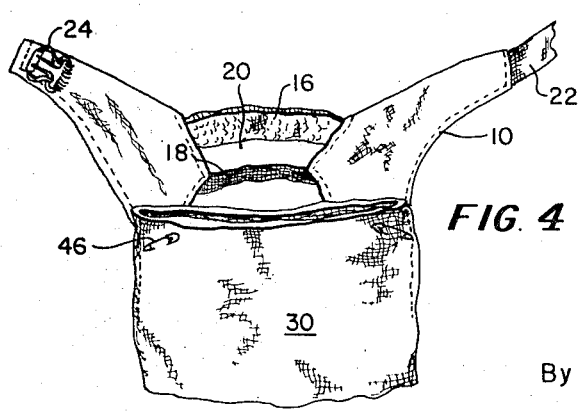
INVENTOR:
JAMES J. KEILMAN
By Harbaugh & Thomas
Attorney

SURGICAL BANDAGE

BACKGROUND OF THE INVENTION

A number of bandages and supports for the male genitals exist in the prior art. In some such devices the bandage is held by snap buttons and auxiliary straps so as to impart restraint and total confinement of these parts of the body without provision for easy replacement and without consideration of ordinary body functions. Also these suspensory bandages must be particularly designed and fabricated to fit the attachments of the belt and cannot be used with ordinary gauze pads or roll bandages. Also no provision is made in the prior art bandages for unconfined isolation and minimizing frictional contacts.

This invention is directed to certain improvements over the prior art devices and to the elimination of these drawbacks.

SUMMARY OF THE INVENTION

The invention concerns a bandage for the male genitals adapted to provide protection and comfort without restriction or interference with bodily functions and which is not cumbersome, does not irritate and is comfortable to wear. More particularly, the invention relates to a supported bandage for the male genitals which provides an open ended soft bandage collar for these parts of the human body that is not subject to irritation or friction during use, is easily applied and changed and is completely sanitary.

DESCRIPTION OF THE DRAWINGS

An embodiment of the invention is shown in the accompanying drawings in which:

FIG. 1 is a disassembled plan view of the supporting belt and tubular bandage;

FIG. 2 is a cross-sectional view taken along the lines 2-2 of FIG. 1;

FIG. 3 is a plan view showing the support and bandage in assembled condition;

FIG. 4 is a perspective view of the assembly shown in FIG. 3; and

FIG. 5 is a partial sectional view of the device of this invention in position on the human body.

THE PREFERRED EMBODIMENT

Referring to the drawings, particularly FIGS. 1 and 3, there is shown a support belt 10 comprising the pliable soft cloth sections 12 and 14 connected by means of a top elastic band 16 and a lower elastic band 18 providing therebetween a space 20 for receipt of the genitals. The belt 10 is provided with a nonelastic belt member 22 on one side and a buckle 24 on the other side. The belt sections 12 and 14 are contoured along the edges 26 and 28 to fit within the juncture of the front lower abdomen and the leg of the patient, as will be described.

The bandage proper, which is attached to and supported by the belt 10, comprises an outer gauze pad 30 and an inner gauze pad 32 which are face to face and stitched to each other marginally along a portion of the sides as indicated at 34. This forms a top portion having a tubular opening 36 and a bottom portion comprising a rear flap 38 and a front flap 40 (see FIG. 3). An alternate construction contemplated by this invention is the elimination of one of the seams 34 by using one sheet of gauze folded upon itself, with the opposed edges sewn or otherwise affixed to form the tubular upper portion and the opening 36.

The bandage or dressing 30-32 is affixed to the belt 10 by any suitable means so that the top edge 42 is above the bottom edges 44 of the sections 12 and 14, as by means of the safety pins 46. The pins 46 can be placed at any distance from each other to vary the size of the opening 36. The pins pass through both gauze pads and into and through the sections 12 and 14 in the normal manner of using safety pins or similar fastenings. The flap 40 can be raised for elimination purposes and the bandage is easily changed.

A feature of the instant invention is the provision of both lateral support and adjustability of the parts of the bandage without losing the frictionless protection offered by the tubular open ended gauze pad. This is accomplished by means of the cooperating elastic bands 16 and 18, the shape of the sections 26 and 28 in relation thereto such that the bandage 30-32 can be affixed at various elevations and the opening 36 is normally urged to closed position. In the position shown in FIGS. 3 and 4, the male genital only will extend through the opening 20 and be enclosed in the bandage, or the scrotum and genitals may extend through the opening 20 with only the genital within the bandage and the back top edge of the bandage pad 32 offering friction-free contact therebetween. Also the elastic band 18 can be positioned between the scrotum and the genital. The band 18 can be of the same length as the band 16 or as illustrated, the latter can be slightly longer. The top elastic band 16 fastens directly between the inner edges of cloth sections 12 and 14 of the belt, while the bottom band 18, which may be non elastic or formed of soft woven cloth or web is affixed to the outer edges, in the preferred embodiment. As an alternative additional versatility in fitting different patients, along with added comfort and protection in all postures can be provided by constructing the band 16 or nonelastic material or by constructing both the bands 16 and 18 of nonelastic material. These constructions, whether the band 18 is over or under the scrotum increases the support and comfort whether the patient is standing, sitting or confined to bed, and also facilitates attachment of the assembly to the patient. The bandage proper, that is the pads 30 and 32, can be used without the belt 10 and affixed to a garment by means of the adjustable pins 46, for emergencies.

Having thus described one or more specific embodiments of this invention, it will be understood that the details of construction and operation shown can be altered or omitted without departing from the spirit of the invention as defined by the appended claims.

I claim:

1. A surgical bandage comprising:
   a pad of absorbent material having a tubular section at one end, the sidewalls of which extend and are diammetrically slit through opposite walls to form a separable pair of flap members at the other end;
   said bandage being normally positioned with the tubular end opening upwardly; and
   individual fastening means to hold said bandage to a garment, said fastening means being adjustably engageable with and through the walls of said pad adjacent the edge of said opening to vary the effective size of said opening in said tubular section.

2. A surgical bandage in accordance with claim 1 including:
   a. belt means to which said pad is attached by means of said fastening means;
   b. said belt having an opening therethrough; and
   c. said opening being defined by a pair of spaced transverse elastic bands.

3. A surgical bandage for male genitals comprising:
   a. a belt adapted to encircle the lower abdomen and back of the patient;
   b. said belt having an elastic section comprising a pair of spaced transverse elastic bands defining an opening therebetween;
   c. an absorbent pad attachable to said belt at the lower edge of said opening;
   d. said pad having a top tubular section the opening of which is contiguous and below said opening between said elastic bands; and
   e. the walls of said tubular section extending downwardly to form a pair of separable front and rear flap members.

4. A surgical bandage in accordance with claim 3 in which said absorbent pad is affixed to said belt by individual attaching means on each side of said lower elastic band whereby the spacing between said attaching means controls the size of the opening in said tubular section.

5. A surgical bandage in accordance with claim 3 in which:

a. said belt has a pair of spaced frontal cloth sections defining the side edges of said opening;
b. the top elastic band is attached across the upper part of said side edges.

c. the lower elastic band is attached across the lower part of said opening; and
d. said lower band is larger than said upper band and is affixed at its ends to the outer edges of said sections.